United States Patent [19]

Teraoka

[11] Patent Number: 5,535,601
[45] Date of Patent: Jul. 16, 1996

[54] AIR CONDITIONING SYSTEM

[75] Inventor: Masao Teraoka, Tochigi-ken, Japan

[73] Assignee: Tochigi Fugi Sangyo Kabushiki Kaisha, Japan

[21] Appl. No.: 390,081

[22] Filed: Feb. 17, 1995

[51] Int. Cl.$^6$ .................................................. F25D 9/00
[52] U.S. Cl. ................................................ 62/402; 62/403
[58] Field of Search ............................... 62/401, 402, 403

[56] References Cited

U.S. PATENT DOCUMENTS

| | | | |
|---|---|---|---|
| 2,925,723 | 2/1960 | Hagen et al. | 62/402 |
| 3,141,310 | 7/1964 | Hoffstrom | 62/402 |
| 3,213,640 | 10/1965 | Dubinsky et al. | 62/402 |
| 3,494,145 | 2/1970 | Davis et al. | 62/402 |
| 3,908,396 | 9/1975 | Windsor | 62/402 |
| 4,015,438 | 4/1977 | Kinsell et al. | 62/402 X |
| 5,172,753 | 12/1992 | Kadle et al. | 62/402 X |

*Primary Examiner*—Christopher Kilner
*Attorney, Agent, or Firm*—Graham & James

[57] ABSTRACT

An air conditioning system comprises: a motor (5, 69); a speed increasing mechanism (7) connected to the motor to increase revolution speed of the motor; an air compressor (3) driven by the motor through the speed increasing mechanism at high speed to produce a high-temperature pressurized air; a cooler (11) for cooling the high-temperature pressurized air; and a turbine (9) for further cooling the pressurized air cooled by the cooler on the basis of adiabatic expansion. The rotational force of the turbine is feed-backed to the motor and the air compressor. In the air conditioning system thus constructed, since the air compressor (3) is driven by the motor (5, 69) through the speed increasing mechanism (7) in particular, it is possible to increase the pressure ratio of the air compressor and the air conditioning capacity, without increasing the size and weight of the air conditioning system.

6 Claims, 3 Drawing Sheets

AIR CONDITIONING SYSTEM

BACKGROUND OF THE INVENTION

1. Technical Field

The present invention relates to an air conditioning system suitable for use in an automotive vehicle.

2. Description of the Related Art

A rotary fluid machine 201 as shown in FIG. 1 is disclosed in Japanese Published Unexamined Patent Application No. 4-134198. This rotary fluid machine 201 is a sort of air conditioning systems. In FIG. 1, a blower 203 is driven by a motor 205 directly connected to the blower 203. The high-temperature pressurized air is cooled by a water-cooled air cooler 207 and further on the basis of adiabatic expansion by a radial turbine 209, and then supplied as a cooling air for air conditioning. Further, the rotational force of the radial turbine 209 is fed-back to the blower 203 and the motor 205 for energy recovery.

In the prior art air conditioning system as described above, however, since the highest possible revolution speed of the motor 205 is about 10,000 r.p.m., when the capacity of the air conditioning system is required to be increased, it is necessary to increase the diameter of blower impellers 211 or the number of impeller stages of the blower 203, thus causing a problem in that the size and the weight of the blower 203 inevitably both increase.

SUMMARY OF THE INVENTION

With these problems in mind, therefore, it is the object of the present invention is to provide an air conditioning system which can increase the air conditioning capacity, without increasing the size and weight thereof markedly.

To achieve the above-mentioned object, the present invention provides an air conditioning system, comprising: a motor; a speed increasing mechanism connected to said motor to increase revolution speed of said motor; an air compressor driven by said motor through said speed increasing mechanism at high speed to produce high-temperature pressurized air; a cooler for cooling the high-temperature pressurized air; and a turbine for further cooling the pressurized air cooled by said cooler on the basis of adiabatic expansion as cooling air, a rotational force of said turbine being supplied to said motor and said air compressor.

Further, in the air conditioning system, the speed increasing mechanism is a planetary step-up gear mechanism includes an internal gear driven by said motor; a plurality of pinions supported by a system casing and in mesh with the internal gear; and a sun gear fixed to a shaft of said air compressor and said turbine and in mesh with said pinions.

Further, the air conditioning system comprises a power transmission mechanism for transmitting power of said motor to said speed increasing mechanism. The power transmission mechanism is a chain and sprocket power mechanism. Further, it is possible to dispose the motor so as to be directly and coaxially connected to said speed increasing mechanism.

Further, it is preferable that warm air obtained when the high-temperature pressurized air is cooled by said cooler is used as warming air.

In the air conditioning system, the air compressor is driven by the motor through the speed increasing mechanism at a high speed to obtain high-temperature high-pressure air. The obtained air is cooled by the cooler and then supplied to the turbine to drive the turbine. In this case, since the cooled air is further cooled on the basis of adiabatic expansion by the turbine, it is possible to use the further cooled air as air for cooling a vehicle passenger room, for instance. Further, since the rotational force is supplied to the air compressor and the motor for energy recovery. Accordingly, it is possible to reduced the motor load and further to improve the overall energy efficiency.

In particular, since the speed increasing mechanism is provided, the air compressor can be rotated at a speed much higher than that of the motor. Therefore, it is possible to increase the pressure ratio of the air compressor, without increasing the diameter of the impeller or the number of impeller stages, with the result that the capacity of the air conditioning system can be improved without increasing the size and weight of the system.

DETAILED DESCRIPTION OF THE EMBODIMENTS

Figure 1:
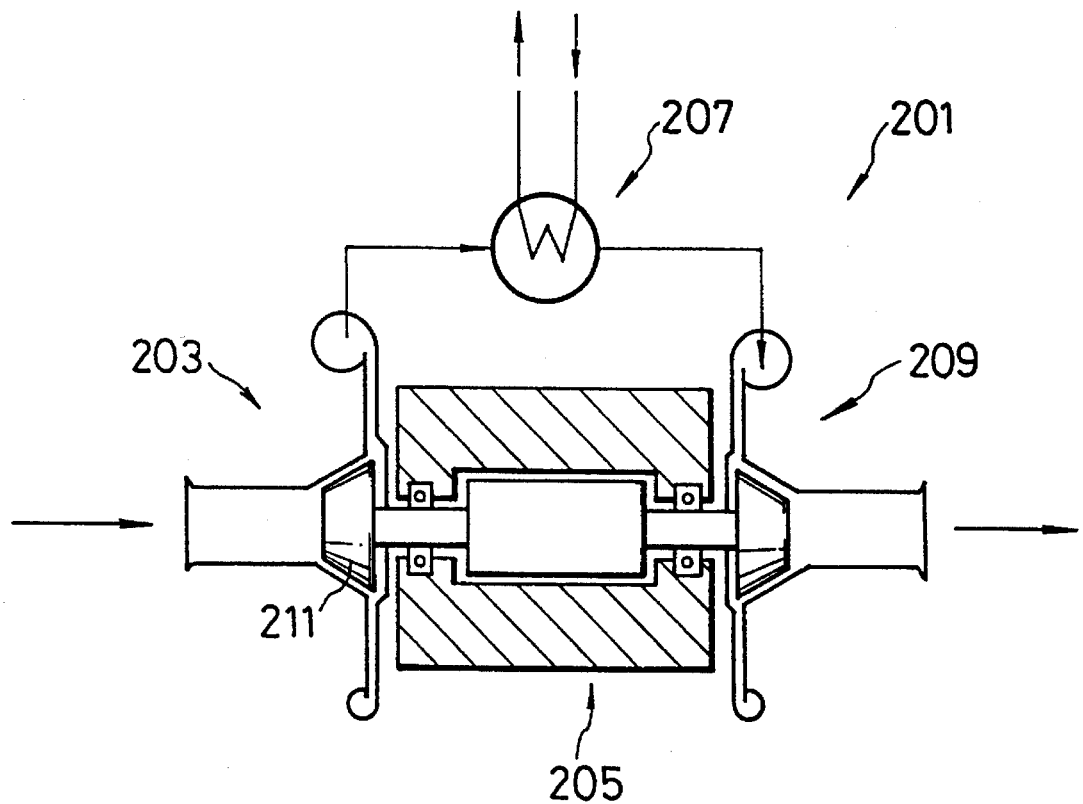
FIG. 1 is a diagrammatical view showing an example of the prior art air conditioning systems.

A first embodiment of the present invention will be described hereinbelow with reference to FIG. 2.

An air conditioning system 1 comprises a centrifugal air compressor 3, a motor 5, a planetary gear type speed increasing (step-up gear) mechanism 7, a turbine 9, and an inter-cooler 11.

The respective impellers 13 and 15 of the air compressor 3 and the turbine 9 are directly connected to an impeller shaft 17. The impeller shaft 17 is rotatably supported by a casing 21 via two floating bushes 19.

An internal gear 23 of the speed increasing mechanism 7 is formed integral with a sprocket 25. The impeller shaft 17 is passed through this sprocket 25. The sprocket 25 is rotatably supported by the casing 21 via two bearings 27. A plurality of pinion gears 29 are supported by pinion shafts 33 via bearings 31, respectively. Each pinion shaft 33 is supported by the casing 21. A sun gear 35 is formed integral with the impeller shaft 17.

An output shaft 37 of the motor 5 is rotatably supported by the casing 21 via two bearings 39, and a sealing member 41 is disposed between the output shaft 37 and the casing 21. The output shaft 37 is engaged with a hollow shaft 38 by a spline mechanism, and the hollow shaft 38 is formed with a sprocket 43 integrally. The hollow shaft 38 is supported rotatably by the casing 21 via bearings 39. The sprocket 25 fixed to the internal gear 23 and the sprocket 43 formed on the hollow shaft 38 are connected with each other via a chain 47. These sprocket 25 and 43 and the chain 47 constitute a chain power transmission mechanism 49.

The revolution of the motor 5 is transmitted to the speed increasing mechanism 7 through the chain power transmission mechanism 49, so that the impellers 13 of the air compressor 3 can be rotated at such a high speed as several tens of thousands of revolutions per minute.

The discharge side of a housing 51 of the air compressor 3 is connected to an inter-cooler 11 through an air flow passage 53. The inter-cooler 11 is provided with a bent cooling pipe and a cooling fin to cool air flowing through the cooling pipe by a fan (not shown) driven by an engine (not shown), for instance. The cooling pipe is connected to a housing 61 of the turbine 9 via another air flow passage 59.

Figure 2:
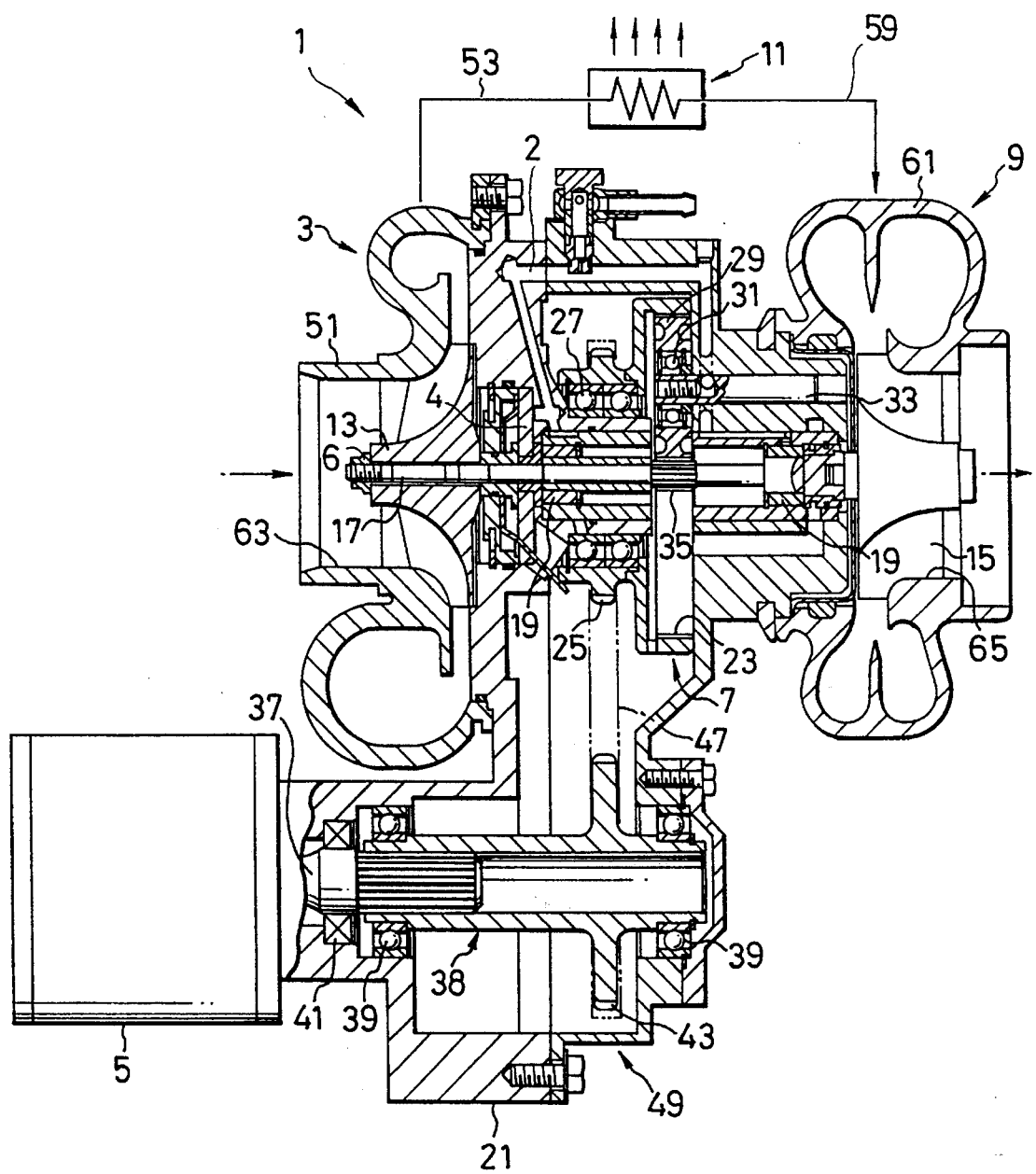
FIG. 2 is a sectional view showing a first embodiment of the air conditioning system according to the present invention.

In addition in FIG. 2, numeral 2 designates a path for oil circulation, numeral 4 designates a thrust washer and numeral 6 designates a nut.

The operation of the air conditioning system according to the present invention will be described hereinbelow.

When the air compressor 3 is driven, normaltemperature air sucked through an inlet port 63 of the air compressor 3 is pressurized to a high temperature, cooled through the inter-cooler 11, and supplied to the turbine 9 to rotate the impellers 15 thereof. In the turbine 9, the air is further cooled on the basis of adiabatic expansion, and then discharged through an output port 65 of the turbine 9 as a cooling air (for cooling the passenger room of an automotive vehicle, for instance). Further, the rotational force of the turbine 9 is feed-backed to the air compressor 3 through the impeller shaft 17 to increase the revolution speed of the air compressor 3. In addition, the rotational force of the turbine 9 is given to the motor 5 via the speed increasing mechanism 7, so that the motor load can be reduced. As described above, since energy can be recovered, it is possible to improve the overall energy efficiency of the air conditioning system 1.

In the above-mentioned structure, since the revolution speed of the motor 5 is increased by the speed increasing mechanism 7, the pressure ratio of the air compressor 3 can be increased without increasing the diameter of the impellers 13 and without constructing the impellers at a multi-stage; that is, the capacity of the air conditioning system can be increased without increasing the size and the weight of the air conditioning system markedly.

Figure 3:
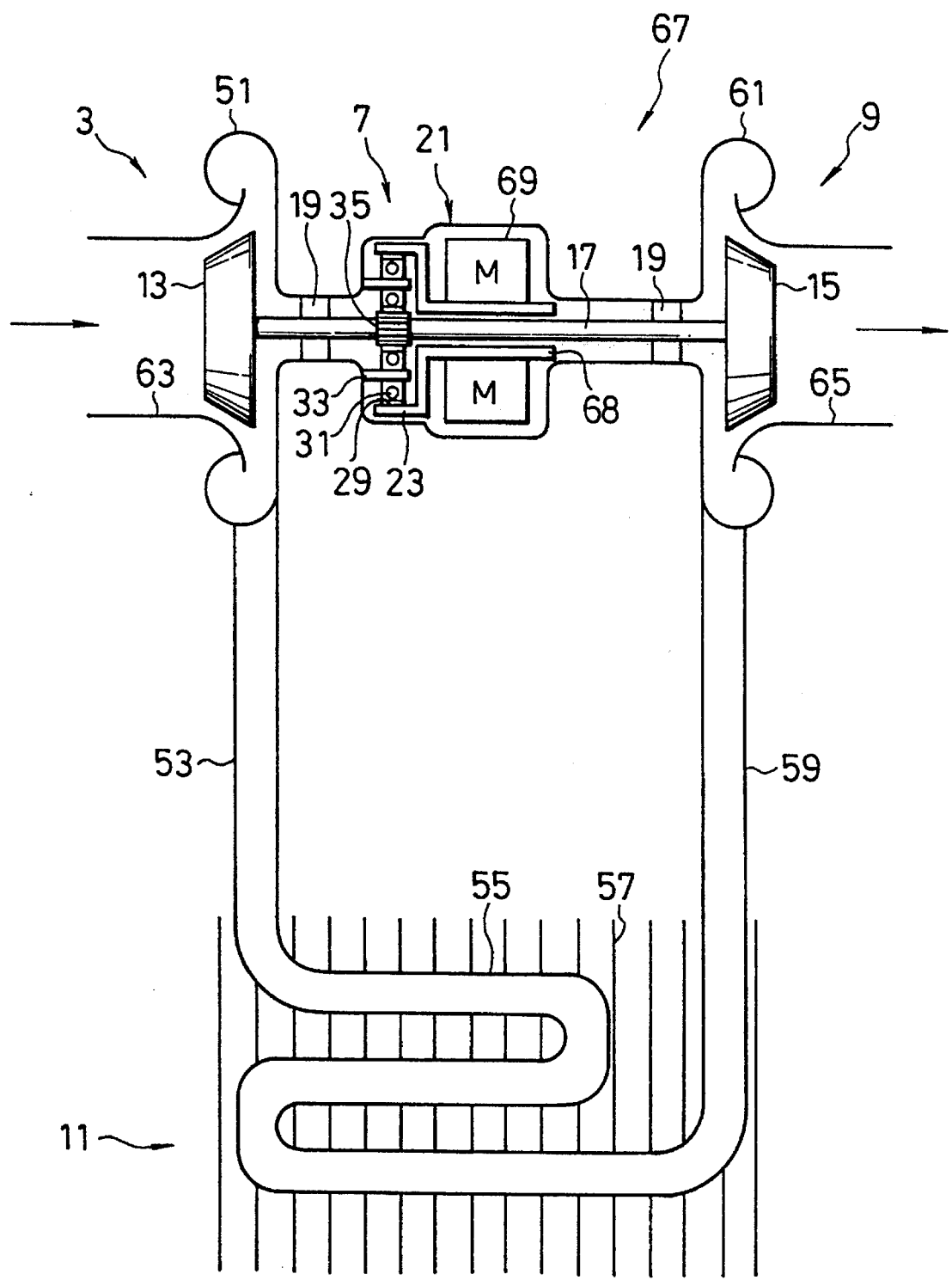
FIG. 3 is a diagrammatical view showing a second embodiment of the air conditioning system according to the present invention.

FIG. 3 shows a second embodiment of the air conditioning system according to the present invention. In the air conditioning system 67 shown in FIG. 3, a motor 69 is disposed coaxially with both the air compressor 3 and the turbine 9 to eliminate the chain power transmission mechanism 49. Therefore, the same reference numerals have been retained for similar elements which have the same functions as with the case of the first embodiment shown in FIG. 2, without repeating the similar description thereof.

The motor 69 is disposed coaxially with a hollow shaft 68. The hollow shaft 68 is fixed to the internal gear 23 coaxially. A stator of the motor 69 is supported by the casing 21 and a rotor thereof is fixed to the hollow shaft 68.

The rotational speed of the motor 69 is increased by the speed increasing mechanism 7 to drive the air compressor 3. The high-temperature pressurized air is cooled by the inter-cooler 11 to drive the turbine 9. Further, the temperature of the air is further reduced on the basis of the adiabatic expansion by the turbine 9 to cool the passenger room of an automotive vehicle, for instance. Further, the rotational force of the turbine 9 is feed-backed to the air compressor 3 via the impeller shaft 17 and to the motor 69 via the speed increasing mechanism 7, respectively, so that the revolution speed of the air compressor 3 can be increased and further the load of the motor 69 can be reduced. Since energy can be recovered as described above, it is possible to improve the energy efficiency of the air conditioning system 67. In addition, since the motor 69 is arranged coaxially with the air compressor 3 and the turbine 9 and thereby the chain power transmission mechanism can be eliminated, it is possible to further reduce the size and weight of the air conditioning system.

Further, it is also possible to utilize air warmed through the inter-cooler 11 due to heat exchange between the high-temperature pressurized air and external air, to warm up the passenger room of an automotive vehicle, for instance.

As described above, in the air conditioning system according to the present invention, the system is so constructed as follows: the revolution speed of the motor is increased by use of the speed increasing mechanism to drive the air compressor; external air is heated by the air compressor; the high-temperature compressed air is used to rotate the turbine so as to be further cooled on the basis of adiabatic expansion; and the cooled air is used as cooling air and in addition the rotational force of the turbine is supplied to the air compressor. Accordingly, it is possible to increase the pressure ratio of the air compressor and to improve the air conditioning capacity, without increasing the size and the weight of the system markedly.

What is claimed is:

1. An air conditioning system, comprising:

a motor;

a speed increasing mechanism connected to said motor to increase revolution speed of said motor;

an air compressor driven by said motor through said speed increasing mechanism at high speed to produce high-temperature pressurized air;

a cooler for cooling the high-temperature pressurized air; and a turbine for further cooling the pressurized air cooled by said cooler on the basis of adiabatic expansion as cooling air, a rotational force of said turbine being supplied to said air compressor and said motor via said speed increasing mechanism.

2. The air conditioning system of claim 1, wherein said speed increasing mechanism is a planetary step-up gear mechanism including:

an internal gear driven by said motor;

a plurality of pinions supported by a system casing and in mesh with the internal gear; and a sun gear fixed to a shaft of said air compressor and said turbine and in mesh with said pinions.

3. The air conditioning system of claim 1, which further comprises a power transmission mechanism for transmitting power of said motor to said speed increasing mechanism.

4. The air conditioning system of claim 3, wherein said power transmission mechanism is a chain and sprocket power mechanism.

5. The air conditioning system of claim 1, wherein said motor is directly and coaxially connected to said speed increasing mechanism.

6. The air conditioning system of claim 1, wherein warm air obtained when the high-temperature pressurized air is cooled by said cooler is used as warming air.

* * * * *